United States Patent [19]

Shigetani et al.

[11] Patent Number: 4,895,688
[45] Date of Patent: Jan. 23, 1990

[54] METHOD OF PRODUCING A SUPPORT FOR PHOTOGRAPHIC PAPER

[75] Inventors: Tsunehisa Shigetani; Masahiro Kamiya; Tatsuo Miyakoda, all of Tokyo; Katsuhiko Sakata, Nichinan; Toshio Inada; Tatsumi Okada, both of Tokyo, all of Japan

[73] Assignee: Oji Paper Co., Ltd., Tokyo, Japan

[21] Appl. No.: 261,310

[22] Filed: Oct. 24, 1988

[51] Int. Cl.⁴ .................. B29C 47/06; B29C 47/40; B32B 27/10; B32B 31/30
[52] U.S. Cl. .................. 264/171; 264/211.23; 264/216; 264/349; 425/204; 427/391; 430/538
[58] Field of Search .............. 264/171, 211.21, 211.23, 264/216, 349; 425/204; 427/391, 393.5; 430/538

[56] References Cited

U.S. PATENT DOCUMENTS

| | | | |
|---|---|---|---|
| 3,382,536 | 5/1968 | Fritsch et al. | 425/204 |
| 4,113,822 | 9/1978 | Takiura et al. | 264/211.23 X |
| 4,447,524 | 5/1984 | Uno et al. | 430/538 |
| 4,513,050 | 4/1985 | Akao | 264/171 X |
| 4,663,103 | 5/1987 | McCullough et al. | 264/171 X |

FOREIGN PATENT DOCUMENTS

| | | | |
|---|---|---|---|
| 10592 | 5/1980 | European Pat. Off. | 264/211.21 |
| 57-46822 | 3/1982 | Japan | 264/171 |
| 57-108849 | 7/1982 | Japan | |
| 57-109948 | 7/1982 | Japan | 264/211 |
| 413053 | 6/1974 | U.S.S.R. | 264/171 |

*Primary Examiner*—Jeffery Thurlow
*Assistant Examiner*—Leo B. Tentoni
*Attorney, Agent, or Firm*—Armstrong, Nikaido Marmelstein, Kubovcik & Murray

[57] ABSTRACT

A support for photographic paper is produced by a method including the steps of coating one or two surfaces of a substrate sheet with a resinous melt includes a water-proof thermoplastic polymer and a pigment, by a melt-extrude-coating method, and solidifying the coating layer of the resinous melt on the substrate sheet, and wherein at least one melt-kneading procedure is applied to the resinous melt in a melt extruder having a pair of biaxial screws engaged with each other and satisfying the relationship (i)

$$L \geq 20D \qquad (I)$$

wherein L is a length of the screws and D is a diameter of the screws, and provided with at least one pair of kneading disks located in at least a portion of the screws.

8 Claims, 2 Drawing Sheets

METHOD OF PRODUCING A SUPPORT FOR PHOTOGRAPHIC PAPER

BACKGROUND OF THE INVENTION (1) Field of the Invention

The present invention relates to a method of producing a support for photographic paper. More particularly, the present invention relates to a method of producing a support for photographic paper provided with a coating layer of a waterproof resinous material in which a pigment is in the form of fine particles evenly dispersed therein, and exhibiting a superior resolving power.

(2) Description of the Related Arts

Formerly, baryta paper was used as a support for photographic paper, but recently a waterproof support composed of a substrate sheet consisting of paper and coating layers comprising a polyolefin resin and formed on two surfaces of the substrate sheet has become widely used for such photographic paper.

The waterproof support is advantageous in that, in a developing step for photographic paper prepared from the waterproof support, the time needed for washing and drying the photographic paper can be shortened, a ferrotype procedure can be omitted, the consumption of chemicals can be reduced, the rigidity and mechanical strength of the photographic paper can be maintained at a high level, and the photographic paper can be protected from staining due to a penetration of chemicals therein.

In the production of photographic paper having a superior resolving power by coating a photographic emulsion on a surface of the waterproof support, it is important to enhance a light-shielding effect of the waterproof resin coating layer of the support. Usually, for this purpose, a white pigment, for example, titanium dioxide powder, is dispersed in the waterproof resin coating layer on the support surface to be coated with the photographic emulsion.

To uniformly disperse the pigment such as titanium dioxide powder in the waterproof resin, a master batch is prepared by melt-kneading a mixture of 20% to 60% by weight of the pigment, for example, titanium dioxide powder, with the balance comprising the waterproof resin, by using a Banbury mixer, kneader or monoaxial knead-extruder, and mixing the master batch with an additional amount of the waterproof resin to adjust the content of the pigment in the resultant mixture to a predetermined level of 5% to 20% by weight. This method is disclosed in Japanese Examined Patent Publication (Kokoku) No. 61-26649.

The preparation of the master batch by using the Banbury mixer or kneader is advantageous in that the resin can be uniformly mixed with the pigment at a high mixing efficiency, but is disadvantageous in that the procedure is carried out discontinuously, i.e., batch-wise, and thus has a low productivity.

The preparation of the master batch by using the monoaxial knead-extruder is advantageous in that the procedure is effected continuously, and thus at a high productivity, but is disadvantageous in that the fine pulverization of the pigment particles and uniform dispersion of the pigment in the resin are unsatisfactory, and thus the light-shielding effect of the resultant resin coating layer in the support for the photographic paper is insufficient and the resolving power of the resultant photographic paper is poor.

As stated above, the conventional processes for producing the support for photographic paper are usually unsatisfactory in both or either the productivity of the process and the quality of the resultant product, especially the fine pulverization and uniform dispersion of the pigment. Therefore, there is a strong demand for a new method of producing a support for photographic paper having a high quality, at a high productivity.

SUMMARY OF THE INVENTION

An object of the present invention is to provide a method of producing a support for photographic paper which can overcome the disadvantages of the conventional method, in which a waterproof resin is mixed with a pigment by using a batch type mixer, such as a low productivity and a poor working efficiency.

Another object of the present invention is to provide a method of producing a support for photographic paper which can overcome the disadvantages of the conventional method, in which a pigment is dispersed in a waterproof resin by using a continuous mixer, such as a poor dispersion of the pigment and a low quality of the resultant product.

Still another object of the present invention is to provide a method of producing a support for photographic paper having waterproof resin coating layers in which a pigment is in the form of fine particles and is uniformly dispersed in a waterproof resin, at an enhanced productivity and working efficiency.

The above-mentioned objects can be realized by the method of the present invention of producing a support for photographic paper, which comprises the steps of: coating at least one surface of a substrate sheet with a resinous melt comprising a water-proof thermoplastic polymer and a pigment, by melt-extrude-coating, and cool-solidifying the resultant coating layer of the resinous melt on the substrate sheet, and which is characterized in that at least one melt-kneading procedure is applied to the resinous melt in a melt extruder having a pair of biaxial screws engaged with each other and satisfying the relationship (I):

$$L \geq 20D \quad (I)$$

wherein L represents a length of each screw and D represents a diameter of each screw, and provided with at least one pair of kneading disks located in at least a portion of the biaxial screws.

DESCRIPTION OF THE PREFERRED EMBODIMENTS

In the method of the present invention, a mixture of a waterproof thermoplastic resin with a pigment is coated on at least one surface, especially an upper side surface on which a photographic emulsion is coated, of a substrate sheet by a melt-extrude-coating method.

The substrate sheet usable for the present invention can be selected from paper sheets usable as a substrate sheet of a conventional support for photographic paper. For example, the substrate sheet is composed of a natural pulp paper sheet, a synthetic pulp paper sheet, a paper sheet consisting of a mixture of natural pulp with a synthetic pulp or a combination sheet consisting of at least two of the above-mentioned sheets.

Usually, natural pulp comprising, as a main component, a soft wood pulp, hard wood pulp or a mixture of the soft wood pulp with the hard wood pulp, is used for the substrate sheet. The substrate sheet may contain a usual additive comprising at least one member selected from, for example, a sizing agent, fixing agent, paper strengthening agent, filler, antistatic agent, and dye. Also, the substrate sheet may have a coating or size press layer comprising at least one member selected from a surface-sizing agent, paper strengthening agent, and antistatic agent, etc.

Preferably, the substrate sheet has a weight of 50 to 300 g/m² and has smooth surfaces.

The waterproof thermoplastic resin for coating the two surfaces of the substrate sheet preferably comprises at least one polyolefin resin. The polyolefin resin is preferably selected from ethylene homopolymers, homopolymers of α-olefins, for example, propylene, and copolymers of at least two of the above-mentioned α-olefins and ethylene. The preferable polyolefin resin is a low density polyethylene resin, a high density polyethylene resin or a mixture of the above-mentioned resins. The molecular weight of the polyolefin resin is not restricted to a specific level, but is preferably from 20,000 to 200,000. Also, preferably each resin coating layer has a weight of 10 to 50 g/m².

The resin coating layer containing a white pigment, for example, titanium dioxide powder, dispersed in a waterproof polyolefin resin, may further contain an additive comprising at least one member selected from coloring pigments, fluorescent brightening agents, antioxidants, and dispersing agents.

The titanium dioxide powder usable as a white pigment for the present invention may be produced by a sulfuric acid method or a chlorine method, and as the anatase or rutile type. Usually, an anatase type titanium dioxide powder is preferable, due to the high brightness thereof.

The titanium dioxide particles may be free from a surface coating layer, or may have surface coating layers comprising an inorganic material, for example, hydrated aluminum oxide, an organic material, for example, an organopolysiloxane, amine compound, alcoholic compound or alkyl titanate, or a combination of the inorganic material with the organic material in a predetermined combining ratio. Preferably, the titanium dioxide particles are surface-treated with hydrated aluminum oxide in an amount of 0.2% to 2.0% by weight in terms of $Al_2O_3$.

The titanium dioxide pigment may contain other coloring pigments, for example, ultramarine, and/or other chemicals, for example, antioxidants or fatty acid metal salts which are usually used for a conventional support for photographic paper.

The ultramarine usable together with titanium dioxide powder for the present invention can be selected from commercially available ultramarine, unless it will cause a deterioration in the quality of the resultant photographic paper. The ultramarine is preferably contained in an amount of 0.05% to 10% based on the weight of the resin composition.

The antioxidant usable for the present invention can be selected from commercially available conventional antioxidants, unless it will cause a deterioration in the quality of the resultant photographic paper. The preferable antioxidants are phenol type, thioether type, and phosphite type antioxidants. The antioxidant is preferably contained in an amount of 5 to 500 ppm, based on the weight of the resin composition.

The fatty acid metal salts usable for the present invention include, for example, zinc stearate, calcium stearate, aluminum stearate, magnesium stearate, zirconium octylate, sodium palmitate, and sodium laurate. The fatty acid metal salts are mixed in an amount of 0.01% to 5% by weight in the titanium dioxide-containing polyolefin resin composition.

The polyolefin resin composition containing titanium dioxide may further include at least one additional white pigment selected from, for example, zinc oxide, talc, calcium carbonate, aluminum hydroxide, and barium sulfate powders, at least one coloring pigment selected from, for example, chrome yellow, titanium yellow, red iron oxide or carbon black, at least one fibrous material selected from, for example, glass fibers, asbestos, and whiskers, and a fluorescent brightening agent.

In the method of the present invention, a resinous melt comprising, as a main compound, a mixture of a waterproof thermoplastic resin and a pigment, is prepared through at least one melt-kneading procedure in a specific extruder.

The specific extruder for the method of the present invention has a pair of biaxial screws engaged with each other and satisfying the relationship (1):

$$L \geq 20D \qquad (1)$$

wherein L represents a length of each screw and D represents a diameter of each screw provided with at least one pair of kneading disks located in at least a portion of the biaxial screws.

The constitution and function of the biaxially engaged melt-extruder usable for the present invention are disclosed, for example, in "Plastic Age", August, 1985, page 75; in "Kagaku Kogaku", December, 1984, page 933, and in "Kogyo Zairyo", vol. 30, No. 11, (1982) page 93.

The biaxially engaged melt-extruder comprises a cylinder provided with a heating means, and a pair of biaxial screws contained in the cylinder and extending in parallel to each other. The pair of biaxial screws rotate in the same direction or in opposite directions, melt-knead a mixture of a thermoplastic resin and a pigment, and extrude the resinous melt in the form of a sheet film, threads or beads. The shapes and dimensions of grooves or ridges formed on the pair of screws are determined in accordance with the direction of rotation of the pair of screws. When the pair of screws rotate in the same direction, the shapes of the grooves or ridges on the pair of screws are the same. When the pair of screws rotate in opposite directions, the shapes of the grooves or ridges on the pair of screws are symmetrical.

Figure 1:
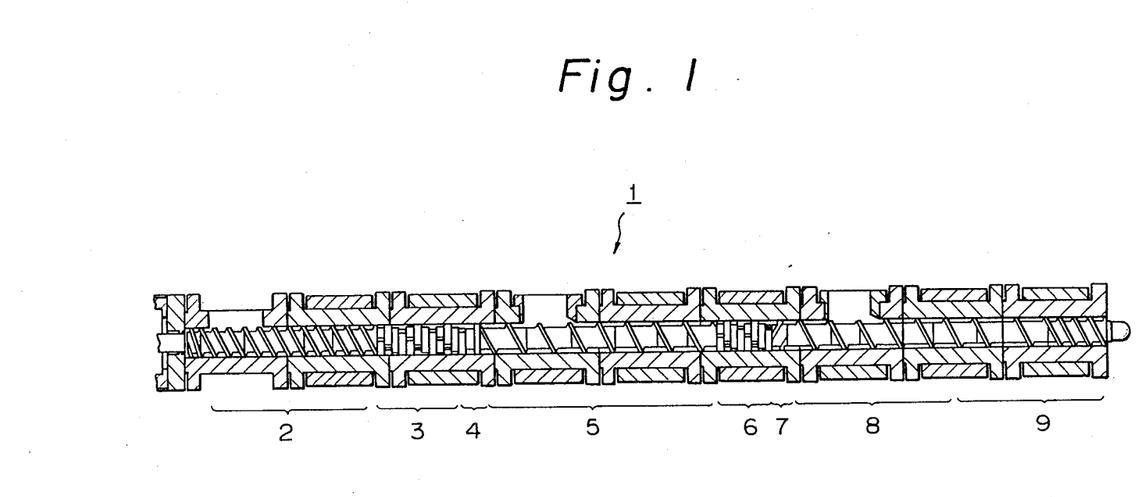
FIG. 1 shows a cross-sectional side view of a screw portion of a biaxially geared screw type extruder usable for the method of the present invention.

Referring to FIG. 1, a biaxially geared screw-type melt-extruder 1 is provided with a first feeding zone 2, a first kneading zone 3, a ring zone (sealing disk zone) 4, a second feeding zone 5, a second kneading zone 6, a reverse threaded spiral ridge zone (sealing zone) 7, a venting zone 8, and a metering zone 9.

Figure 2:
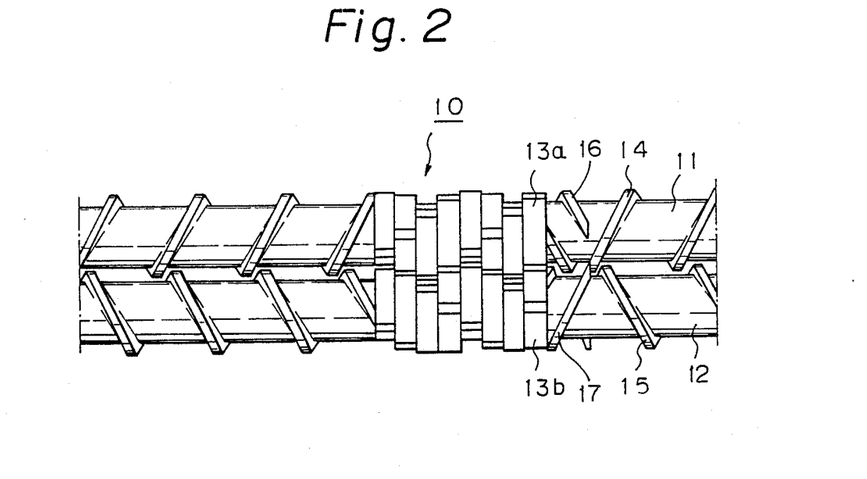
FIG. 2 is an enlarged plane view of the screw portion including a plurality of anisotropic type kneading disks; and, FIGS. 3A and 3B show cross-sectional profiles of a three lobe type kneading disk and a two lobe type kneading disk, respectively.

Referring to FIG. 2, a portion of a pair of biaxially geared screws 10 is provided with a pair of screws 11 and 12, and a plurality of kneading disks 13a and 13b located in portions of the screws 11 and 12. The threaded portion 14 formed in the screw 11 has a spiral ridge 14 surrounding the screw 11 in a direction opposite to that of a ridge 15 spirally surrounding the screw 12.

The screws 11 and 12 shown in FIG. 2 rotate in opposite directions, and thus the kneading disks 13a fixed to the screw 11 rotate in a direction opposite to that of the kneading disks 13b fixed to the screw 12.

The screw 11 has a threaded spiral ridge 16 winding in an opposite direction to the direction of winding of the spiral ridge 14, and the screw 12 has a threaded spiral ridge 17 winding in an opposite direction to the direction of winding of the spiral ridge 15. The opposite-wound spiral ridges 16 and 17 serve as sealing members.

Of course, the pair of screws may have ridges or grooves spirally surrounding in the same direction around the screws. In this case, both screws rotate in the same direction, and thus the kneading disks fixed to the screws rotate in the same direction.

When a resinous melt of a water-proof resin-pigment mixture is kneaded by a biaxially geared screw-type melt extruder in accordance with the method of the present invention, a high position exchange effect and a strong shearing effect are applied to the resinous melt so that the pigment particles are finely pulverized and evenly dispersed in a matrix consisting of the waterproof resin melt. The term "position exchange effect" refers generally to an effect of the melt extruder in uniformly distributing the pigment particles to be dispersed in the waterproof resin melt. The term "shearing effect" refers to an effect of the melt extruder in finely pulverizing the pigment particles into very fine primary particles and evenly dispersing the finely pulverized pigment particles in the waterproof resin melt.

A preferable biaxially geared screw type melt extruder used for the method of the present invention is the biaxially geared parallel screw type melt extruder disclosed in "Kogyo Zairyo", vol. 30, No. 11 page 95 (1982). Preferably, the screws have shallow grooves, and the pair of screws may rotate in the same direction or in opposite directions.

To evenly disperse the pigment particles in the waterproof resin melt matrix with a high degree of dispersion of a high efficiency, the biaxially geared screws must satisfy the relationship (I):

$$L \geq 20D,$$

more preferably $$L \geq 25D$$

wherein L represents a length of the screws and D represents a diameter of the screws.

Each screw preferably has 1 to 3 threads, more preferably 3 threads.

To very evenly disperse the pigment particles in the resin melt matrix with an enhanced high shearing effect, at least one pair of kneading disks are provided in at least one portion of the biaxially gearing screws, and at least one kneading disk fixed to a screw engages a corresponding at least one kneading disk fixed to the other screw.

Figure 3A:
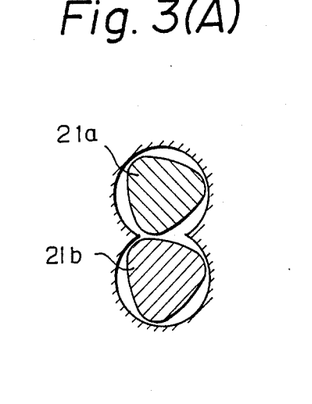

Referring to FIG. 3 (A), the kneading disks 21a and 21b have the form of a three lobe disk.

Figure 3B:
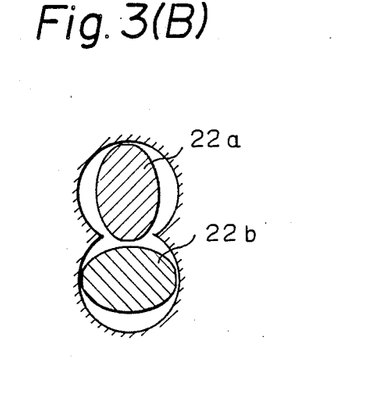

Referring to FIG. 3 (B), the kneading disks 22a and 22b have the form of a two lobe (elliptical) disk.

The major axis of the kneading disks on each screw must be smaller than the inside diameter of the cylinder in which the screw is contained so that the kneading disks can rotate in a predetermined direction without coming into contact with the peripheral surface of the kneading disks on the other screw, or with the inside wall surface of the cylinder.

The rotation of the kneading disks causes a strong shearing force to be applied to the pigment particles located in the spaces between the lobes of the kneading disks engaging each other, and between the lobes of the kneading disks and the inside wall surface of the cylinder, so that the pigment particles are finely pulverized and uniformly dispersed in the resin melt matrix.

The kneading disks are located at a portion of the biaxial screws, or two or more portions thereof, and spaced from each other. In each location, one or more kneading disks are fixed to each screw so that each disk on each screw engages a disk on the other screw without coming into contact therewith.

In the biaxially geared screw type melt extruder usable for the present invention, the kneading disks on each screw preferably have a total thickness T satisfying the relationship (II):

$$2D \leq T \leq 10D$$

more preferably
$$4D \leq T \leq 10D$$

wherein D is as defined above.

Where two or more kneading disks are fixed to each screw, the kneading disks may be arranged in such a manner that the lobes in each disk are positioned with a difference in phase angle from the lobes in an adjacent disk, so that the kneading disks exhibit a screwing function. Of course, the disks may be arranged without providing the differential phase angle.

When the differential phase angle is provided, the phase angles of the lobes in the kneading disks may lead or lag along the direction of the threads on the screws.

In the biaxially geared screw type melt extruder usable for the method of the present invention, at least one pair of sealing disks 4 shown in FIG. 1 or opposite threaded spiral ridges 7 shown in FIG. 1 or ridges 16 and 17 shown in FIG. 2 are preferably arranged on at least a portion of the screws and located immediately downstream the kneading disks. These sealing disks effectively prevent an undesirable short pass of the resinous melt or pigments in the extruder.

An example of the biaxially geared screw type extruder usable for the method of the present invention is as follows.

A portion of each screw located downstream of the feeding portion in a cylinder has a length L satisfying the relationship:

$$L = 28D$$

wherein D represents the diameter of the screws.

In a first location far from the feeding portion by a distance corresponding to 3/7 of the length of the cylinder, a plurality of two lobe or three lobe type kneading disks having a total thickness of 2.5D are arranged on the screws without a differential phase angle between the locations of the lobes.

Also, in a second location far from the feeding portion by a distance corresponding to 5/7 of the length of the cylinder, a plurality of two or three lobe type kneading disks having a total thickness of 2.5D are arranged on the screws. The kneading disks located in the second location have a differential phase angle of, for example, 30 degrees, provided between two adjacent disks and successively lead along the direction of the spiral threads on the screws.

The biaxially gearing screw type extruder usable for the method of the present invention is preferably provided with a temperature control device for controlling the temperature of the resinous melt fed into the cylinder to a predetermined level.

The biaxial screws may be rotated in the same direction or in different directions.

When the screws are rotated in opposite direction, a disadvantage arises in that a latitude in which the relationship between the feeding rate of the resin-pigment mixture and the compression ratio can be controlled is unsatisfactorily narrow, i.e., when the mixture is fed at an excessively large rate, an excessively large load is applied in the extruder, and when the mixture fed at an excessively small rate, a necessary pressure for the fed mixture is not generated. Accordingly, in general, the biaxial screws are preferably rotated in the same direction.

In the melt extruding operation, the waterproof thermoplastic resin is uniformly mixed with 5% to 80%, based on the weight of the resin, of an additive including a pigment, and the resultant resinous melt is extruded in a predetermined form.

In the method of the present invention, the mixture of the waterproof thermoplastic resin and the pigment, for example, titanium dioxide powder, may be prepared in such a manner that a masterbatch or compound is prepared from a waterproof thermoplastic resin and 10% to 80%, based on the weight of the resin, of a pigment, by using the biaxially gearing disk type extruder, and then the masterbatch is diluted by a resin to adjust the concentration of the pigment to a predetermined level.

The biaxially geared screw type extruder usable for the method of the present invention is adequate for continuous operation, and thus feed materials to be mixed in the extruder can be continuously fed into the extruder at a precise feeding rate.

The feeding device usable for the extruder is a constant delivery feeder or other type feeder, for example, a gravitational feeder, reciprocal type feeder, vibration type feeder, endless belt type feeder, screw type feeder or table type feeder. The constant delivery feeder is preferably selected from, for example, screw type constant delivery feeders (for example, the Auger type, Live Bin screw type, Accurate screw type, K-tron screw type, Acrison type, Novadel type, and biaxially metering type feeders) and table type constant delivery feeders (for example, Table Feeder, Grooved Disc Feeder, and Stepped Disc Feeders).

In the above-mentioned feeding device, the feeding rate can be controlled by detecting a differential fluctuation in the feeding rate, by using a decrease-type metering device and by feeding the detected data to the feeding device to determine an increase or decrease in the feeding rate needed to stabilize the feeding rate.

The resin and the additive including the pigment may be fed separately into the extruder. Alternatively, the resin and the additive can be preliminarily mixed to a predetermined proportion, and the resultant mixture fed into the extruder.

The mixture of the waterproof thermoplastic resin, for example, a polyolefin resin, with a pigment, for example, a titanium dioxide powder, produced by using the above-mentioned biaxially geared screw type extruder can be used as a masterbatch. The masterbatch is diluted with an additional amount of the resin and the resultant mixture is subjected to a melt-extrude-coating procedure. Alternatively, the diluted mixture is converted to a masterbatch or compound by using a second biaxial or monoaxial screw type extruder, and the masterbatch or compound is subjected to the melt-extrude-coating procedure. The diluted mixture may be directly supplied as a compound to the coating procedure.

In the coating procedure, a melt of the resin-pigment mixture is continuously extruded in the form of one or more (co-extrusion) thin filmy streams through one or more slit dies, and the one or more thin filmy streams are continuously laminated on one or two surfaces of a substrate sheet which is supplied at a predetermined constant speed. The resin pigment mixture is preferably melt-extruded at a temperature of 200° C. to 350° C..

Before the coating procedure, the surfaces of the substrate sheet to be coated are preferably subjected to an activation treatment, for example, a corona discharge or flame treatment, to enhance the bonding of the substrate sheet surfaces to the resinous coating layers. The thickness of the coating layers is not limited to a specific level, and preferably the thickness of the coating layers is from 5 $\mu$m to 50 $\mu$m.

In a usual support composed of a substrate sheet and two resinous coating layers covering the two surfaces of the substrate sheet, one resinous coating layer which contains a pigment such as titanium dioxide has a smooth glossy surface, matted surface or a silk fabric-like surface and the other resinous coating layer usually has a non-glossy surface.

The upper surface or both the upper and lower surface of the support may be activated by a corona discharge or flame treatment, to enhance the bonding property of the support.

Optionally, the upper surface of the support is coated with a sub-coat to enhance the adhesion of the support surface to the photographic emulsion. Also, if necessary, the back surface of the support is coated to enhance the writing or printing property and/or antistatic property of the support.

EXAMPLES

The present invention will be further illustrated by way of specific examples.

In the examples, the light scattering coefficient S of the surface of the support was determined in the following manner.

A resin coating layer was peeled from a support produced by the resinous melt-coating method, and the resultant resin coating layer subjected to the following test for determining the light-scattering efficient.

Test device: Hunter Whiteness meter (using a blue filter)

Measurement:

(i) A specimen (peeled coating layer) was superimposed on a white plate having a reflection density Rg, and the light reflectivity R of the surface of the specimen backed by the white plate was measured.

(ii) The specimen was superimposed on a black plate having a reflection density of zero, and the light reflectivity $R_0$ of the surface of the specimen backed by the black plate was measured.

(iii) The weight W (g/m$^2$) of the specimen was measured.

Note: Generally, the Rg was in the range of from 0.8 to 0.85.

Calculation:

The light scattering coefficient S (cm$^2$/g) of the specimen was calculated in accordance with the following equation, which is a modification of the Kubelka-Munk equation:

$$S = \frac{1}{W}\left( \frac{1}{1/R_\infty - R_\infty} \ln \frac{(1 - R_0/R_\infty)}{(1 - R_0/R_\infty)} \right)$$

wherein $R_\infty = (-b + \sqrt{b^2 - 4a^2})/2a$ $$a = -Rg\frac{R_0^2}{R}$$

and $$b = Rg\left[ \frac{R_0}{R} + \frac{R_0^2}{R} - R_0 + RgR_0^2 \right]$$

The light scattering coefficient of the specimen is a parameter of the degree of dispersion of pigment particles in the specimen. When the content of the pigment particles is fixed, the light scattering coefficiency of the specimen is utilized as a parameter for evaluating not only the degree of dispersion of the pigment particles but also the resolving power of the resultant photographic paper produced from the support.

EXAMPLE 1

A resin mixture was preliminarily prepared by mixing, by a tumbler type mixer, 40 parts by weight of a high density polyethylene resin having a density of 0.94 g/cm$^3$ and a melt index (MI) of 8 g/10 min. with 60 parts by weight of titanium dioxide (available under a trademark, Titanium Dioxide A-220, and made by Ishihara Sangyo K.K.), 0.18 parts by weight of an antioxidant (available under a trademark, Irganox 1010, and made by Ciba-Giegy), 1.8 parts by weight of zinc stearate, and 0.36 parts by weight of a blue pigment mixture consisting of equivalent weights of blue ultramarine and violet ultramarine (both available under trademarks, #2000 and DV-1, respectively, and made by Daiichi Kasei Kogyo K.K.).

The resin mixture was fed at a constant delivery rate into a biaxially geared screw type melt-extruder through an Auger type constant delivery feeder, and converted to a masterbatch.

The extruder was provided with a pair of biaxial screws satisfying the relationship L/D=30, the diameter of the screws being 65 mm.

Each screw was provided with a plurality of segment type kneading disks having a total thickness of 2.5 D and three lobes, which were not arranged at a differential phase angle of the lobes, and located far from the feeding zone by a distance corresponding to 3/7 of the length of the screws, and 9 segment type kneading disks having a thickness of 0.25D, provided with 3 lobes, which were arranged at a differential phase angle of 30 degrees, and located far from the feeding zone by a distance equal to 5/7 of the length of the screws. The screws were rotated in the same direction.

The extruder was operated at a extruding rate of 50 kg/h and a rotating speed of 2000 rpm. The resin mixture was heated to a temperature of about 110° C. in the front half portion of the extruder and then to a temperature of about 150° C. in the rear half portion of the extruder, and pellet type masterbatch was obtained.

The masterbatch was divided into 4 portions. Each portion of the masterbatch was mixed with a high density (HD) polyethylene resin having a density of 0.94 g/cm$^3$ and an MI of 8 g/10 min, and/or a low density (LD) polyethylene resin having a density of 0.918 g/cm$^2$ and an MI of 7 g/10 min., and the resultant mixture was pelletized to provide pellets having a composition indicated in Table 1.

Types A1, A2, A3, and A4 of the pellets, as shown in Table 1, were obtained.

Paper sheets were then separately prepared in the following manner.

A pulp mixture of 20% by weight of a soft wood bleached sulfite pulp (NBSP) having a Canadian standard freeness of 250 ml, and 80% by weight of a hard wood bleached sulfate pulp (LBKP) having a Canadian standard freeness of 280 ml was converted to paper sheets having a weight of 170 g/m$^2$, a density of 1.0 g/cm$^3$, and a moisture content of 8% by weight, by an ordinary paper-making method. In this paper-making process, an additive having the following composition was added to the pulp mixture:

| Component | Amount (% based on the dry weight of pulp) |
|---|---|
| Cationized starch | 2.0 |
| Alkyl ketene dimer resin | 0.4 |
| Anionic polyacrylic amide resin | 0.1 |
| Polyamidepolyamine-epichlorohydrin resin | 0.7 |

The pH of the white water was adjusted to 7.5 by a sodium hydroxide solution.

An aqueous size solution of 5% by weight of a size press agent consisting of 2 parts by weight of a carboxyl-modified polyvinyl alcohol resin and 1 part by weight of sodium chloride was applied in an amount of 25 g/m$^2$ to two surfaces of each paper sheet, to provide substrate sheets. The back surfaces of the substrate sheets were treated with an ordinary corona discharge treatment and then coated with a resin mixture of 1 part of weight of a high density polyethylene resin having a density of 0.94 g/cm$^3$ and an MI of 8.0 g/10 min and 1 part by weight of a low density polyethylene resin having a density of 0.92 g/cm$^3$ and an MI of 4.6 g/10 min, by a melt-extrude-coating method at a temperature of 330° C.. The resultant layers coated on the back surfaces of the substrate sheets were solidified by cooling with, and were matted by, a cooling roll. The resultant back surface coating layers had a thickness of 30 μm.

Each of the pellets A1, A3, and A4 was coated on the upper surfaces of the substrate sheets by a melt-extrude-coating method, to form upper surface coated layers containing TiO$_2$ in the concentration shown in Table 1.

The pellets A2 were diluted with a high density polyethylene resin, to adjust the concentration of TiO$_2$ to 10% by weight. The mixture of the pellets A2 and the polyethylene resin was applied to the upper surfaces of the substrate sheets in the same manner as mentioned above, to form upper surface coated layers containing 10% by weight of TiO$_2$.

The resultant upper surface coated layers exhibited satisfactory light scattering coefficients, as indicated in Table 1.

EXAMPLE 2

In Example 2, the same procedures as mentioned in Example 1 were carried out except that the resin mixture had the compositions indicated in Table 1. An additive mixed by a Henschel mixer and consisting of 0.09 parts by weight of the same antioxidant as in Example 1, 0.9 parts by weight of zinc stearate and 0.18 parts by weight of the same ultramarine mixture was added to the resin mixture.

The resultant resin mixture in an amount of 30 parts by weight was fed into a biaxially geared screw type melt extruder through a table type constant delivery feeder and mixed therein with 70 parts by weight of a high density polyethylene resin having a density of 0.94 g/cm$^3$ and an MI of 8.0 g/10 min. The feeding rates of the resin mixture and the high density polyethylene resin were controlled to predetermined constant levels by using a decrease-type metering device. The mixture was converted to masterbatch pellets by the above-mentioned extruder at an extruding rate of 50 kg/h and at a rotating speed of 180 r.p.m. In the front half portion of the extruder, the mixture was heated at a temperature of 110° C. and in the rear half portion of the extruder, the mixture was heated at a temperature of 150° C.. And masterbatch pellets were obtained.

The masterbatch pellets were divided into pellets B1, B2 and B3, and the pellets B1 and B3 were applied to upper surfaces of the substrate sheets in the same manner as in Example 1.

The pellets B2 were mixed with a high density polyethylene resin and the mixture was applied to upper surfaces of the substrate sheets so that the concentration of TiO$_2$ in the resultant upper surface coating layer reached the level indicated in Table 1.

The resultant upper surface coating layers had the light scattering efficiencies indicated in Table 1, which were satisfactory.

EXAMPLE 3

In Example 3, the same procedures as those described in Example 2, were carried out with the following exceptions.

The masterbatches C and D applied to the upper surfaces of the substrate sheets had the compositions as indicated in Table 1.

The masterbatch C was prepared by rotating the biaxial screws in the same direction, and the masterbatch D was prepared by rotating the biaxial screws in opposite directions.

In the preparation of the masterbatches C and D by the biaxially geared screw type melt extruder, the extruding rate was 50 kg/h, the speed of rotation was 150 r.p.m., the melting temperature in the front half portion of the extruder was 110° C., and the melting temperature in the rear half portion and adapter portion was 150° C..

The masterbatches C and D were directly subjected to the upper surface coating procedures.

The resultant upper surface coating layers had the light scattering coefficiencies shown in Table 1, which were satisfactory.

EXAMPLE 4

In Example 4, the same procedures as described in Example 2 were carried out with the following exceptions.

The preliminarily mixed resin mixture was fed into a biaxially geared screw-type melt extruder through a constant delivery feeder and mixed in the extruder with a high density polyethylene resin having a density of 0.94 g/cm$^3$ and a MI of 8.0 ml/10 min, and fed into the extruder through an Auger type feeder. The mixing ratio in weight of the preliminary resin mixture to the high density polyethylene resin was 15:85, and the feeding rates thereof were controlled by the same method as in Example 2.

The biaxially geared type screw melt extruder used in Example 4 was of the same type as described in Example 1, except that the three lobe kneading disks located close to the feeding zone were replaced by a pair of disks having a thickness of 0.75 D in a Banbury kneading rotor-like shape and rotating in the same direction and a pair of disks rotating in the opposite directions, and the three lobe kneading disks located far from the feeding zone were replaced by 12 kneading disks having a differential phase angle of the lobes of 30 degrees, 6 disks rotating in the same direction and the other 6 disks rotating in opposite directions.

In the preparation of the resin compound E by the biaxially geared screw type extruder, the extruding rate was 50 kg/h, the speed of rotation of the screws was 200 rpm, and the temperatures at the front half portion and the rear half portion of the extruder were 110° C. and 150° C., respectively.

The resin compound E was melted and applied to the upper surfaces of the substrate sheets, and the resultant upper surface coating layers had a satisfactory light scattering coefficient as indicated in Table 1.

EXAMPLE 5

In Example 5, the same procedures as in Example 1 were carried out with the following exceptions.

The resin mixture was replaced by a low density polyethylene resin having a density of 0.918 and an MI of 7 ml/10 min. In the biaxially geared screw type extruder, the temperatures of the front half portion and the rear half and adapter portions were 90° C. and 130° C., respectively.

The resultant masterbatch F had the composition as indicated in Table 1.

The masterbatch F was divided into two portions and the portions were mixed with a high density polyethylene resin or a mixture of a high density polyethylene resin and a low density polyethylene resin in a mixing ratio in weight of 1:1 by using an extruder, to adjust the concentration of TiO$_2$ to the level as indicted in Table 1.

Pellets F1 and F2 were obtained and were subjected to the melt-extruder-coating procedures.

The resultant upper surface coating layers on the substrate sheets exhibited the satisfactory light scattering coefficient shown in Table 1.

COMPARATIVE EXAMPLE 1

In Comparative Example 1, the same procedures as in Example 1 were carried out with the following exceptions.

The masterbatch X was prepared by using a 1.7 l Banbury mixer in place of the biaxially geared screw type melt extruder. The Banbury mixer was operated at a ratio of a volume of the charge to the entire inside volume of the mixer of 0.7. Also, during the operation, the temperature of the Banbury mixer was controlled to a temperature of 150° C. for 15 minutes by applying heat or by water cooling. The resultant resin mixture was removed from the Banbury mixer and formed into a sheet by using a sheeter, and converted to square pellets by using a square cutting pelletizer (Type SGE-220, made by Horai Works) to provide masterbatch pellets X containing $TiO_2$ in a high concentration of 60% by weight.

The masterbatch pellets X were divided into three portions, and these portions were diluted with a high density polyethylene resin to adjust the concentration of $TiO_2$ to the level indicated in Table 1, by using an extruder to provide pellets X1, X2, and X3.

The pellets X1 and X3 were directly subjected to the melt-extrude-coating procedure, the pellets X2 were mixed with a high density polyethylene resin to adjust the concentration of $TiO_2$ to 10% by weight, and the resin mixture was applied to the upper surface of the substrate sheets by the melt-extruder-coating procedure.

The resultant upper surface coating layers formed on the substrate sheets had unsatisfactory light scattering coefficients.

COMPARATIVE EXAMPLE 2

In this comparative example, the same procedures as described in Example 4 were carried out with the following exceptions.

In the biaxially geared screw type melt extruder, the kneading disks located in the location far from the feeding zone were removed and were replaced by usual screws.

The composition of the resultant masterbatch Y was the same as that of the masterbatch A in the Example 1. The kneading operation of the biaxially geared screw type extruder was carried out at an extruding rate of 50 kg/h, at a speed of rotation of 200 r.p.m, at a temperature of the front half portion of 110° C., and at a temperature of the rear half portion of 150° C..

The resultant masterbatch Y was divided into two portions, and these portions were mixed with a high density polyethylene resin by an extruder to adjust the concentration of $TiO_2$ to the levels indicated in Table 1.

The resultant resin pellets Y1 were directly subjected to the melt extrude-coating procedure.

The resin pellets Y2 were mixed with a high density polyethylene resin, to adjust the concentration of $TiO_2$ to 10% by weight, and then the resultant mixture was applied to upper surface of the substrate sheets by a melt extrude-coating method to provide upper surface coating layers on the substrate sheets.

The resultant upper surface coating layers exhibited the unsatisfactory light scattering coefficients shown in Table 1.

TABLE 1

| | Kneading operation in extruder | | | | Dilution in extruder | | | Melt extruder-coating | | |
|---|---|---|---|---|---|---|---|---|---|---|
| No. | $TiO_2$ (Part by weight) | PE(*)3 (Part by weight) | Rotating direction of screws | Type of masterbatch or compound | Type of pellet | Type of diluting centration resin | $TiO_2$ con-diluting (wt %) | Type of centration resin | $TiO_2$ con-scattering (wt %) | Light coefficient |
| Example | | | | | | | | | | |
| 1 | 60 | HD (*)1 40 | The same direction | A | A1 | HD | 10 | — | 10 | 703 |
| | | | | | A2 | HD | 30 | HD | 10 | 694 |
| | | | | | A3 | HD/LD | 10 | — | 10 | 715 |
| | | | | | A4 | HD | 15 | — | 15 | 910 |
| 2 | 30 | HD 70 | The same direction | B | B1 | HD | 10 | — | 10 | 711 |
| | | | | | B2 | — | — | HD | 10 | 702 |
| | | | | | B3 | HD | 15 | — | 15 | 921 |
| 3 | 10 | HD 90 | The same direction | C | C1 | — | — | — | 10 | 680 |
| | 10 | HD 90 | Opposite directions | D | D1 | — | — | — | 10 | 671 |
| 4 | 15 | HD 85 | The same direction | E | E1 | — | — | — | 15 | 901 |
| 5 | 60 | LD(*)2 40 | The same direction | F | F1 | LD | 10 | — | 10 | 710 |
| | | | | | F2 | HD/LD | 10 | — | 10 | 708 |
| Comparative Example | | | | | | | | | | |
| 1 | 60 | HD 40 | Bambury mixer | X | X1 | HD | 10 | — | 10 | 621 |
| | | | | | X2 | HD | 30 | HD | 10 | 618 |
| | | | | | X3 | HD | 15 | — | 15 | 809 |
| 2 | 60 | HD 40 | The same direction | Y | Y1 | HD | 10 | — | 10 | 456 |

TABLE 1-continued

| | Kneading operation in extruder | | | | Dilution in extruder | | | Melt extruder-coating | | |
|---|---|---|---|---|---|---|---|---|---|---|
| No. | TiO2 (Part by weight) | PE(*)3 (Part by weight) | Rotating direction of screws | Type of masterbatch or compound | Type of pellet | Type of diluting resin | TiO2 concentration (wt %) | Type of centration resin | TiO2 concentration (wt %) | Light scattering coefficient |
| | | | | (*)4 | Y2 | HD | 30 | HD | 10 | 452 |

Note
(*)1: HD - High density polyethylene resin
(*)2: LD - Low density polyethylene resin
(*)3: PE - Polyethylene resin
(*)4: Kneading disks in rear portion of extruder were omitted.

Table 1 clearly shows that the resultant upper surface coating layers formed on the substrate sheets in accordance with the method of the present invention exhibited satisfactory light scattering coefficients, taking into consideration the concentration of the titanium dioxide particles. This illustrates that the titanium dioxide particles were finely pulverized and evenly dispersed in the coating layer of the present invention.

The comparative coating layers in Comparative Example 1 (wherein the biaxially geared screw type extruder having kneading disks was replaced by a Bambury mixer) and a Comparative Example 2 (wherein the kneading disks in the rear portion of the extruder were removed) exhibited unsatisfactory light scattering coefficients.

The advantages of the method of the present invention are as follows.

(1) By using a biaxially geared screw type melt extruder having a specific ratio L/O and provided with kneading disks, the pigment particles, for example, titanium dioxide particles, can be finely pulverized and evenly dispersed in the resin matrix, the kneading operation can be carried out at a high efficiency, and a high quality support for photographic paper can be produced at a high productivity.

(2) The utilization of the biaxially geared screw type melt extruder results in a reduction of operating difficulties in the extrude-coating process, especially, in a reduction of microgrit-formation and the lip strain-formation.

(3) Since the pigment particles can be evenly dispersed in the resin matrix, application of a surface treatment to the pigment particle surfaces with a surface-treating agent or dispersing agent becomes unnecessary, or the amount of the surface treating agents is greatly reduced. This non or greatly reduced use of the surface treating agent results in no or little lip stain or microgrit-formation.

We claim:

1. A method of producing a support for photographic paper, comprising the steps of:
preparing a resinous melt from a resinous material comprising a water proof thermoplastic polymer and a pigment and continuously coating at least one surface of a substrate sheet with the resinous melt by a melt-extrude-coating procedure; and
solidifying the resultant coating layer of the resinous melt on the substrate sheet,
wherein the resinous melt to be coated on the surface of the substrate sheet contains at least a portion thereof to which at least one melt-kneading procedure is applied in a melt extruder having a pair of biaxial screws engaged with each other, satisfying the relationship (I):

$$L \geqq 20D \tag{I}$$

wherein L represents a length of each screw and D represents a diameter of each screw, and provided with at least one pair of kneading disks located in at least a portion of the biaxial screws.

2. The method as claimed in claim 1, wherein the melt extruder further comprises with at least one pair of sealing disks arranged on at least a portion of the biaxial screws and located immediately downstream of the kneading disks.

3. The method as claimed in claim 1, wherein the kneading disks on each screw have a total thickness T satisfying the relationship (II):

$$2D \leqq T \leqq 10D \tag{II}$$

wherein D is as defined above.

4. The method as claimed in claim 1, wherein the substrate sheet comprises paper.

5. The method as claimed in claim 1, wherein the water-proof thermoplastic polymer comprises polyolefin polymers.

6. The method as claimed in claim 5, wherein the polyolefin polymer comprises polyethylene polymers.

7. The method as claimed in claim 1, wherein the pigment consists essentially of titanium dioxide.

8. The method as claimed in claim 1, wherein the melt extruder further comprises at least one pair of opposite threaded spiral ridges arranged on at least a portion of the biaxial screws and located immediately downstream of the kneading disks.

* * * * *